(12) United States Patent
Cho (10) Patent No.: US 8,452,232 B2
(45) Date of Patent: May 28, 2013

(54) AUTOMATIC ON-OFF SWITCHING REPEATER FOR MIMO NETWORKS

(75) Inventor: Bong Youl Cho, Seoul (KR)

(73) Assignee: Intel Corporation, Santa Clara, CA (US)

( * ) Notice: Subject to any disclaimer, the term of this patent is extended or adjusted under 35 U.S.C. 154(b) by 953 days.

(21) Appl. No.: 12/542,860

(22) Filed: Aug. 18, 2009

(65) Prior Publication Data

US 2011/0045766 A1    Feb. 24, 2011

(51) Int. Cl.
*H04B 7/15* (2006.01)
(52) U.S. Cl.
USPC .......... 455/11.1; 455/13.1; 455/13.3; 455/15; 455/16
(58) Field of Classification Search
None
See application file for complete search history.

(56) References Cited

U.S. PATENT DOCUMENTS

| 7,139,527 | B2 * | 11/2006 | Tamaki et al. | 455/16 |
| 8,059,727 | B2 * | 11/2011 | Proctor et al. | 375/260 |
| 2007/0160014 | A1 * | 7/2007 | Larsson | 370/338 |
| 2009/0054105 | A1 * | 2/2009 | Hermel | 455/562.1 |

FOREIGN PATENT DOCUMENTS

| EP | 2169847 A2 * | 3/2010 |
| KR | 10-2001-0018104 A | 3/2001 |
| KR | 10-2002-0073459 A | 9/2002 |
| WO | WO 2008057290 A1 * | 5/2008 |
| WO | 2011/022147 A2 | 2/2011 |
| WO | 2011/022147 A3 | 4/2011 |

OTHER PUBLICATIONS

Wan Choi, Bong Youl Cho, and Tae Won Ban, Automatic On-Off Switching Repeater for DS/CDMA Reverse Link Capacity Improvement, IEEE Communications Letters, vol. 5, No. 4, Apr. 2001, pp. 138-141.*
International Search Report and Written Opinion for PCT Patent Application No. PCT/US2010/042537, mailed on Feb. 25, 2011, 9 pages.
International Preliminary Report on Patentability for PCT PCT/US2010/042537, Issued on Feb. 21, 2012, 5 pages.
Ban, Tae W., et al., "On the Capacity of a DS/CDMA System with Automatic On-Off Switching Repeaters", IEEE International Conference on Communications, vol. 3, 2001, pp. 780-784.
Choi, Wan et al., "Automatic On-Off Switching Repeater for DS/CDMA Reverse Link Capacity Improvement", IEEE Communications Letters, vol. 5, No. 4, Apr. 2001, pp. 138-141.

* cited by examiner

*Primary Examiner* — Fayyaz Alam
*Assistant Examiner* — Mohammed Rachedine
(74) *Attorney, Agent, or Firm* — Cool Patent, P.C.; Joseph P. Curtin; Kenneth J. Cool (57) ABSTRACT

Briefly, in accordance with one or more embodiments, a MIMO repeater turns off one or more transmitters of the MIMO repeater if there is no mobile station in the coverage area of the MIMO repeater to reduce noise enhancement on a MIMO network. If there is a repeater in the coverage of the MIMO repeater, the MIMO repeater turns off or keeps off its transmitters that do not have a sufficient channel quality in a respective antenna path, and turns on its transmitters having a sufficient channel quality in the respective antenna path transmits uplink signals from the mobile station via the turned on transmitters to further reduce noise enhancement by not using transmitters that do not significantly contribute to signal quality.

14 Claims, 4 Drawing Sheets

AUTOMATIC ON-OFF SWITCHING REPEATER FOR MIMO NETWORKS

BACKGROUND

In the mobile communications industry, utilization of a repeater or relay has been regarded as one possible solution to efficiently extend the coverage of a base station of the network. One problem involved in using repeater, however, is the noise enhancement in the uplink, which can decrease the uplink capacity of the communication system. In multiple-input, multiple-output (MIMO) systems in which one repeater may have multiple antennas, the noise enhancement problem may be much more serious than in typical single-input, single-output (SISO) systems. For example, if there are M number of SISO repeaters connected to a base station, the noise enhancement in the uplink is proportional to the number M. If there are M number of MIMO repeaters having N number of antenna elements each connected to the base station, the noise enhancement in the uplink is proportional to the product M×N, which quickly reach an unacceptable level. As the order of MIMO increases, for example, in which M×N is about 20×4, the noise enhancement in the uplink of the MIMO communications network raised by the utilization of MIMO repeaters will become increasingly significant. This is especially true as MIMO is deployed in wireless wide area networks (WWANs), such as cellular communication networks or in Wireless Interoperability fir Microwave Access (WiMAX) type networks in addition to wireless local area networks (WLANs) and/or personal area networks (PANs).

DESCRIPTION OF THE DRAWING FIGURES

Claimed subject matter is particularly pointed out and distinctly claimed in the concluding portion of the specification. Such subject matter, however, may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It, however will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled may, however, also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. "Over" may, however, also mean that two or more elements are not in direct contact with each other. For example, "over" may mean that one element is above another element, but not contact each other and may have another element or elements in between the two elements. Furthermore, the term "and/or" may mean "and," it may mean "or," it may mean "exclusive-or," it may mean "one," it may mean "some, but not all," it may mean "neither," and/or it may mean "both" although the scope of claimed subject matter is not limited in this respect. In the following description and/or claims, the terms "comprise" and "include," along with their derivatives, may be used and are intended as synonyms for each other.

Figure 1:
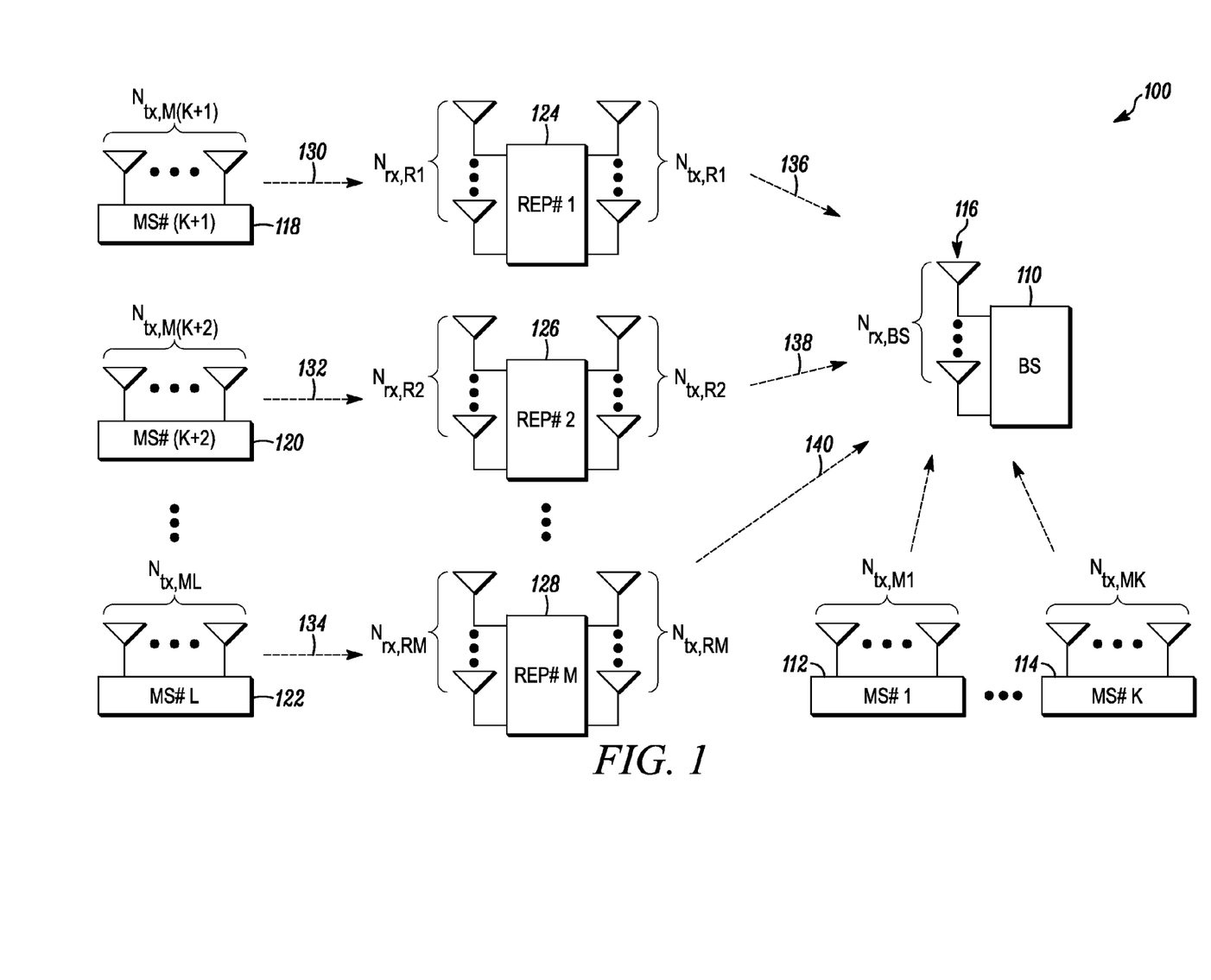
FIG. 1 is a diagram of a MIMO communication network utilizing one or more repeaters in accordance with one or more embodiments.

Referring now to FIG. 1, a diagram of a MIMO communication network having one or more repeaters in accordance with one or more embodiments will be discussed. In one or more embodiments, network 100 may comprise a wireless communication network, such as a wireless local area network, a personal area network, and/or a wireless wide area network. Network 100 may include a base station (BS) 110 communicating directly with one or more mobile stations, such as mobile station 1 (MS1) 112 up to K number of mobile stations including mobile station K (MSK) 114. In a MIMO type network, base station 110 may include N number of receive antennas (Nrx, BS) receiving communication signals from the respective mobile stations each having N number of transmit antennas (Ntx, MI) and (Ntx, MK). It should be noted that although FIG. 1 illustrates an example in which one or more mobile stations are transmitting to base station 110, it should be noted that communication between the mobile stations and base station 110 may be two-way in which base station may transmit to the one or more mobile stations, and the one or more mobile stations may transmit to base station 110, and the scope of the claimed subject matter is not limited in this respect.

In one or more embodiments, additional mobile stations, such as mobile station (MSK+1) 118, mobile station (MSK+2) 120, up to L−K ((in which L≧K) number or additional mobile stations including mobile station (MSL) 122 may be remotely disposed from base station 110, such that the signal strength and/or quality may be low, or there may be interference from other radio signal sources, signal fading, and/or multipath due to larger sized objects in the vicinity of base station 110. In such embodiments, one or more repeaters, such as repeater (Rep1) 124, repeater (Rep2) 126 up to M number of repeaters including repeater (RepM) 128, may be utilized to repeat the signals transmitted between such additional mobile stations 118, 120, and/or 122. In such embodiments, the mobile stations and/or the repeaters may include N number of transmit antennas, which may also operate as receive antennas in some embodiments as discussed above. For example, mobile station 118 may include N transmit antennas x, M(K+1)), mobile station 120 may include N transmit antennas (Ntx, M(K+2)), and/or mobile station 122 may include N transmit antennas (Ntx, ML). Likewise, repeater 124 may include N receive antennas (Nrx, R1) and N transmit antennas (Ntx, R1), repeater 126 may include N receive antennas (Nrx, R2) and N transmit antennas (Ntx, R2), and repeater 128 may include N receive antennas (Nrx, RM) and N transmit antennas (Ntx, RM). In operation, the repeaters may receive signals transmitted from the remote mobile stations and retransmit the signals to base station 110. Likewise, the repeaters may receive signals transmitted from base station 110 and retransmit the signals to the intended recipient mobile station. For example, as shown in FIG. 1, repeater 124 may retransmit signals between mobile station 118 and base station 110, repeater 126 may retransmit signals between mobile station 120 and base station 110, and repeater 128 may retransmit signals between mobile station 122 and base station 110, although the scope of the claimed subject matter is not limited in this respect.

In one or more embodiments, in order to reduce noise introduced via the utilization of one or more repeaters in MIMO network 100, automatic on-off switching (AOS) may be implemented as discussed herein. In such embodiments, a given repeater on network 100 monitors the uplink signal from its respective mobile stations. For example, repeater 124 may monitor the uplink signal 130 received from mobile station 118, repeater 126 may monitor the uplink signal 132 received from mobile station 120, and/or repeater 128 may monitor the uplink signal 134 received from mobile station 122. The repeater utilizes a "Low Limit Check" to check whether or not there is active mobile station in its coverage area. The transmitter of the repeater will be off in the event there is not an active mobile station in its coverage area. If the repeater detects there is an active mobile station in its coverage area, the repeater will turn on its transmitter to amplify and forward its respective uplink signal from the active mobile station to base station 110. The repeater detects an active mobile station in its coverage area when the repeater detects a signal above the specified Low Limit. Otherwise, the transmitter of the repeater is off in order to reduce the noise present on network 100. For example, if repeater 124 detects an uplink signal 130 from mobile station 118 that is above the Low Limit, repeater 124 turns on its transmitter and transmits the signal received from mobile station 118 to base station 110 via uplink signal 136. If however, if repeater 124 does not detect any signal above the Low Limit, there is no need for the transmitter of repeater to be turned on, so repeater 124 can turn off its transmitter. Repeater 126 and repeater 12.8 may operate in a similar manner regarding uplink signal 132 and uplink signal 134 from mobile station 120 and mobile station 122 by turning on their respective transmitters to retransmit via uplinks 138 and 140. It should be noted that the repeaters may operate in this manner for any of the mobile stations as mobile station 118, mobile station 120, and/or mobile station 122 moves in and out of the coverage areas of the repeaters, and/or as the mobile stations are transmitting or not transmitting their uplink signals.

In one or more embodiments, one or more of the repeaters may exhibit abnormal behavior. An example of abnormal repeater behavior may include power divergence in the repeater via infinite feedback due to a possible lack of isolation between the receive antennas and the transmit antennas, circuit aging, and/or various other reasons. Such power divergence in the reverse link of a repeater may affect the whole reverse-link performance of base station 110 if the repeater is connected in the reverse link, a potentially catastrophic result. In order to address this type of adverse behavior, a "High Limit Check" may be implemented in which a repeater may check whether or not there is abnormal behavior within repeater and, if detected, the repeater turns off its transmitter to protect the uplink of base station 110. For example, if repeater detects an output signal at its transmitter that is above the High Limit, the repeater will turn of its transmitter thereby shutting down uplink transmissions between the repeater and base station 110. In one or more embodiments, any one or more of the repeaters on network 100 may implement such automatic on-off switching (AOS) via the Low Limit and/or the High Limit as discussed. By implementing AOS in a MIMO repeater, the repeater may be turned on only when it is actually delivering the signals from a mobile station to base station 110, and furthermore only when the repeater is operating properly. As a result, unnecessary noise enhancement that would otherwise be introduced via the multiple antenna elements of the MIMO repeaters may be reduced, and furthermore the uplink of base station 110 may be protected from abnormal and behavior of the MIMO repeaters.

In some embodiments, when a given MIMO repeater is turned on, for example any one or more of repeater 124, repeater 126, and/or repeater 128, all N of its antennas and/or transmitters may be turned on. In this situation, the noise enhancement on network 100 resulting from this MIMO repeater will be N times greater than the noise enhancement from one single-input, single-output (SISO) type repeater. For example, assume there are K number of active and turned on MIMO repeaters out of total M number of MIMO repeaters. The noise enhancement on network 100 is proportional to K×N in this case. This noise enhancement, which is proportional to K×N, can be higher than that in which network 100 utilizes M number of SISO repeaters, which is proportional to M when all M number of SISO repeaters are turned on. When network 100 utilizes MIMO repeaters and a MIMO repeater is turned on, the contribution of the each antenna element of the MIMO repeater to the uplink channel improvement may different wherein some antenna elements can greatly enhance the uplink channel, but some others may not contribute much. As a result, automatic on-off switching may implement channel estimation to estimate channel quality of each uplink channel from the mobile station at the each antenna element. In one or more embodiments the channel-quality estimate may be based at least in part on a Received Signal Strength Indicator (RSSI), a Signal to Interference and Noise Ratio (SINR), and/or other techniques to estimate channel quality. Based on a per-antenna channel quality determination, the repeater can decide to turn on or off a particular antenna element in its array of antennas. Thus, in one or more embodiments, one or more of the MIMO repeaters of network 100 may implement automatic on-off switching as discussed herein above to turn on or turn of its transmitter to transmit uplink signals from a mobile station to base station 110 to reduce noise enhancement in network 100 from the repeaters. Such automatic on-off switching may operate to turn on or turn of the entire uplink transmission function of a given MIMO repeater. Furthermore, the MIMO repeaters may implement per antenna on-off switching to provide additional reduction in noise enhancement wherein individual antennas having higher channel quality are turned on (or remain on) and antennas having lower channel quality are turned off (or remain off). Transmission quality may be maintained since only antennas having a sufficient channel quality are turned on, and the remaining antennas may be turned off. By utilizing such per antenna on-off switching, noise enhancement from K active repeaters having N antenna elements may have a noise enhancement proportional to K×N, which may be reduced to K×W wherein W represents the number of turned on after inactive antenna elements are tuned off. As a result, the noise enhancement from M number of repeaters in a MIMO network 100 having N number of antenna elements may be reduced to K×W by reducing the number of turned on repeaters from M to K, and by reducing the number of turned on antennas from N to W, although the scope of the claimed subject matter is not limited in these respects. An example architecture of a MIMO repeater utilizing automatic on-off switching including per antenna on-off switching is shown in and described with respect to FIG. 2, below.

Figure 2:
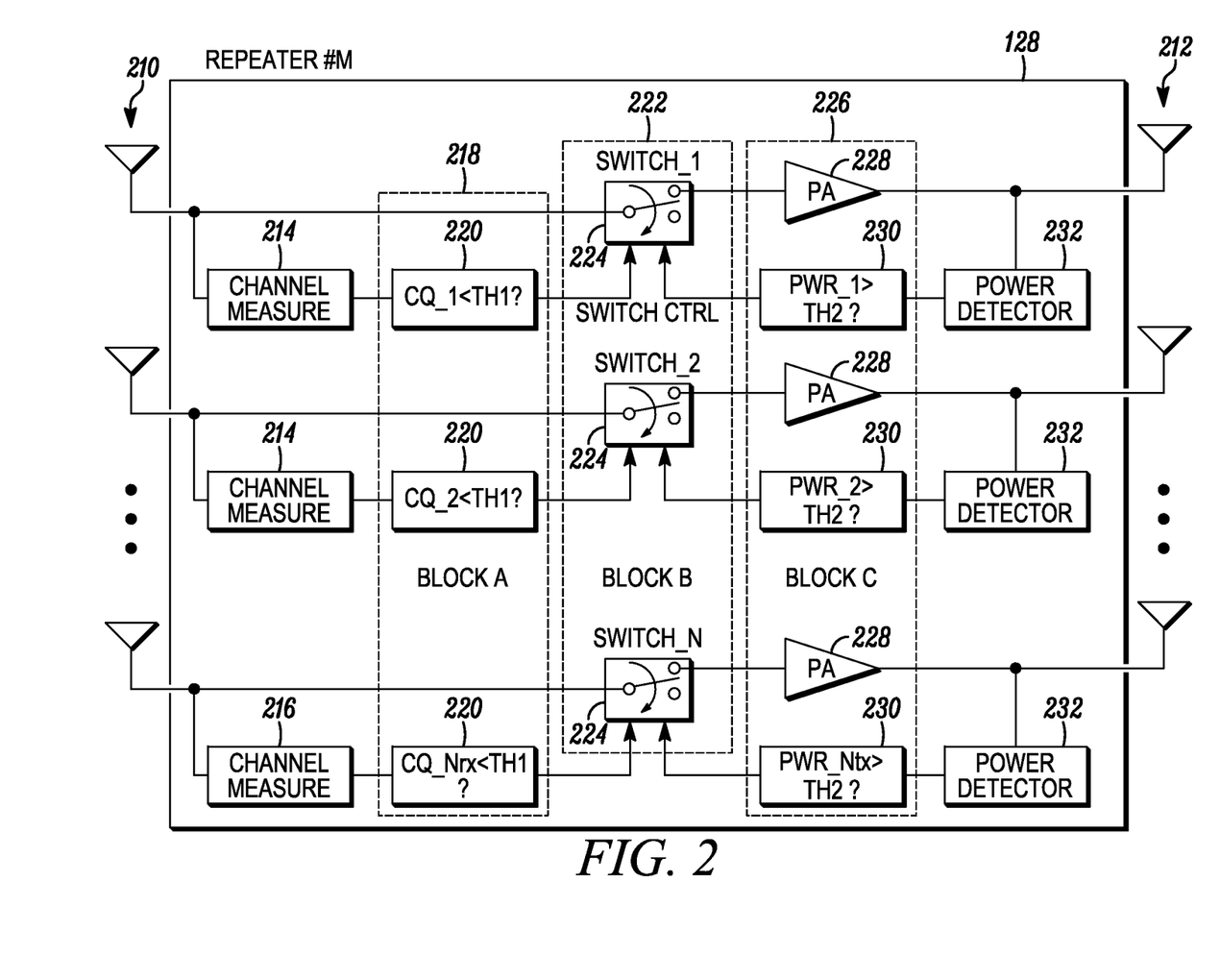
FIG. 2 is a diagram of a repeater for a MIMO communication network as shown in FIG. 1 capable of implementing automatic on-off switching in accordance with one or more embodiments.

Referring now to FIG. 2, a diagram of a repeater for a MIMO communication network implementing automatic on-off switching in accordance with one or more embodiments will be discussed. As shown in FIG. 2, MIMO repeater 128 may be one of M number of repeaters on network 100 of FIG. 1, and the architecture of repeater 128 may the same or similar to the architecture of one or more of the other repeaters of network 100. Repeater 128 includes N number of receive antennas 210 to communicate with a given mobile station or multiple mobile stations under its coverage, and N number of transmit antennas 212 to communicate with base station 110. In order to decide whether there is an active mobile station under its coverage. MIMO repeater 128 measures channel quality (CQ). In one or more embodiments, channel quality may be represented in various formats such as received signal strength indication (RSS1), signal to noise ratio (SNR), or combinations thereof. A channel measure circuit 214 may be coupled to each of the receive antennas 210 to measure and/or estimate a channel quality at each receive antenna 210 to implement per antenna on-off switching. The channel quality measure obtained by channel measure circuit 214 is passed to a comparison circuit 220 which compares the channel quality measure to a threshold value Th1. The comparison circuits are disposed in lock A 220. If the channel quality at a given receive antenna 210 is not sufficient, then a control signal may be passed to a corresponding switch 224 disposed in Block B 222. Switch 224 is coupled to the power amplifier 228 of a corresponding transmit antenna 212. An insufficient channel quality at a given receive antenna 210 will cause the switch 224 to disconnect from power amplifier 228, thereby turning off the uplink channel for the corresponding transmit antenna 212 of repeater 128. Channel quality measured may be measured in each antenna branch to obtain separate channel quality values (CQ_1, CQ_2, . . . , CQ Nrx) that are compared against an appropriate threshold value (Th1). In one or more embodiments, an algorithm to decide if there is no active mobile station communicating with repeater 128 may be as follows in one non-limiting example:

| IF: | (CQ_1 < Th1 and CQ_2 < Th1 . . . and CQ_Nrx < Th1) |
|---|---|
| THEN: | no active MS under the repeater's coverage |
| SO: | turn all switches off |
| OTHERWISE: | an active MS is under the repeater's coverage |
| SO: | turn all switches on |

It should be noted that this is merely one example algorithm and other algorithms likewise may be implemented. For example, in alternative embodiment, if a predetermined number of channel-quality values are greater than the threshold, which may be less than all of the antenna branches, then all of the switches may be turned on. For example, if two or more channel-quality values are greater than the threshold, then all of the switches may be turned on. The scope of the claimed subject matter is, however, not limited in this respect. In general, in one or more embodiments, a sufficient number of antennas and/or transmitters may be turned off, which means a number that may result in a satisfactory amount of reduction in noise and/or noise enhancement, which may be, for example, one antenna and/or transmitter, all or nearly all of the antennas and/or transmitters, and/or any number within the range of one antenna and/or transmitter and/or all of the antennas and/or transmitters. The determination of when to turn all of the antennas on or all of the antennas off may be implemented in Block A 218. The turning on or turning of repeater 128 may be realized via the switches 224 of Block B 222. In one or more embodiments, if no active mobile station is communicating with repeater 128, then all of the antenna branches may be turned off. Such an algorithm may be utilized to turn on or turn off the uplink transmission function of repeater 128 in its entirety. It should be noted that repeater 128 may similarly function for downlink transmissions from base station 110 to a mobile station, and the scope of the claimed subject matter is not limited in this respect.

In one or more embodiments, abnormal behavior by repeater 128 may be detected via Block C 226 wherein each antenna branch may include a power detector circuit 232 coupled to the output of power amplifier 228 at the input of a given transmit antenna 212. The outputs of the power detector circuits 232 are provided to power comparison circuits 230 to compare a detected power level (Pwr_1, Pwr_2, . . . , Pwr_Nrx) of each antenna branch against an appropriate threshold value (Th2). In one or more embodiments, an algorithm to determine if a particular repeater 128 is behaving abnormally can be as follows in one non-limiting example:

| IF: | (Pwr_1 > Th2) |
|---|---|
| THEN: | turn switch_1 off |
| OTHERWISE: | turn switch_1 on |
| . . . | |
| IF: | (Pwr_Nrx > Th2) |
| THEN: | turn switch_Nrx off |
| OTHERWISE: | turn switch_Nrx on |

In the above non-limiting example, each antenna branch may be independently turned on or off based on a detected abnormal power level applied to the transmit antenna in a given antenna branch. Likewise, other algorithms may be implemented in the alternative. For example, if one of the antenna branches has a detected power level greater than a threshold value then all of the power antenna branches may be turned off. In general, in one or more embodiments, a sufficient number of antennas and/or transmitters may be turned off, which means a number that may result in a satisfactory amount of reduction in noise and/or noise enhancement, and/or a number which may bring the repeater back to normal behavior, which may be, for example, one antenna and/or transmitter, all or nearly all of the antennas and/or transmitters, and/or any number within the range of one antenna and/or transmitter and/or all of the antennas and/or transmitters. It should be noted that various other abnormal behavior algorithms may be implemented, and the scope of the claimed subject matter is not limited in this respect.

Furthermore, each antenna element can be turned on or off separately when there is an active mobile station communicating with repeater 128 in order to implement per antenna automatic on-off switching based on the channel quality at each antenna element. A non-limiting example of such a per antenna on-off switching algorithm may be as follows:

| IF: | (CQ_1 < Th3) |
|---|---|
| THEN: | turn switch_1 off |
| OTHERWISE: | turn switch_1 on |
| ... | |
| If: | (CQ_Nrx < Th3) |
| THEN: | turn switch_Nrx off |
| OTHERWISE: | turn switch_Nrx on |

In the above non-limiting example algorithm, individual transmit antennas 212 may be turned off if the channel quality at that antenna branch is below a predetermined threshold value which is threshold value Th3. In general, in one or more embodiments, a sufficient number of antennas and/or transmitters may be turned off which means a number that may result in a satisfactory amount of reduction in noise and/or noise enhancement, which may be, for example, one antenna and/or transmitter, all or nearly all of the antennas and/or transmitters, and/or any number within the range of one antenna and/or transmitter and/or all of the antennas and/or transmitters. It should noted that the comparison circuits 220 of Block A 218 may be adapted to measure the channel quality against both threshold value Th1 and/or threshold value Th3, which may be the same values or may be different values depending on the particular algorithms implemented, and the scope of the claimed subject matter is not limited in these respects.

In one or more embodiments, by utilizing automatic on-off switching (AOS) for the MIMO repeaters of network 100, only the MIMO repeaters having an active mobile station under their coverage and/or that are behaving properly will be turned on in order to reduce the number of unnecessarily turned-on MIMO repeaters, which will reduce uplink noise resulting from implementing MIMO repeaters. In addition, for the MIMO repeaters that are turned on and active, only the antenna elements of the repeaters that are contributing to overall communication are turned on, which the other non-contributing antennas are turned off, in order to further reduce the number of unnecessarily turned-on repeating elements, which provides further noise reduction. A flow diagram of such an example algorithm is shown in and described with respect to FIG. 3, below.

Figure 3:
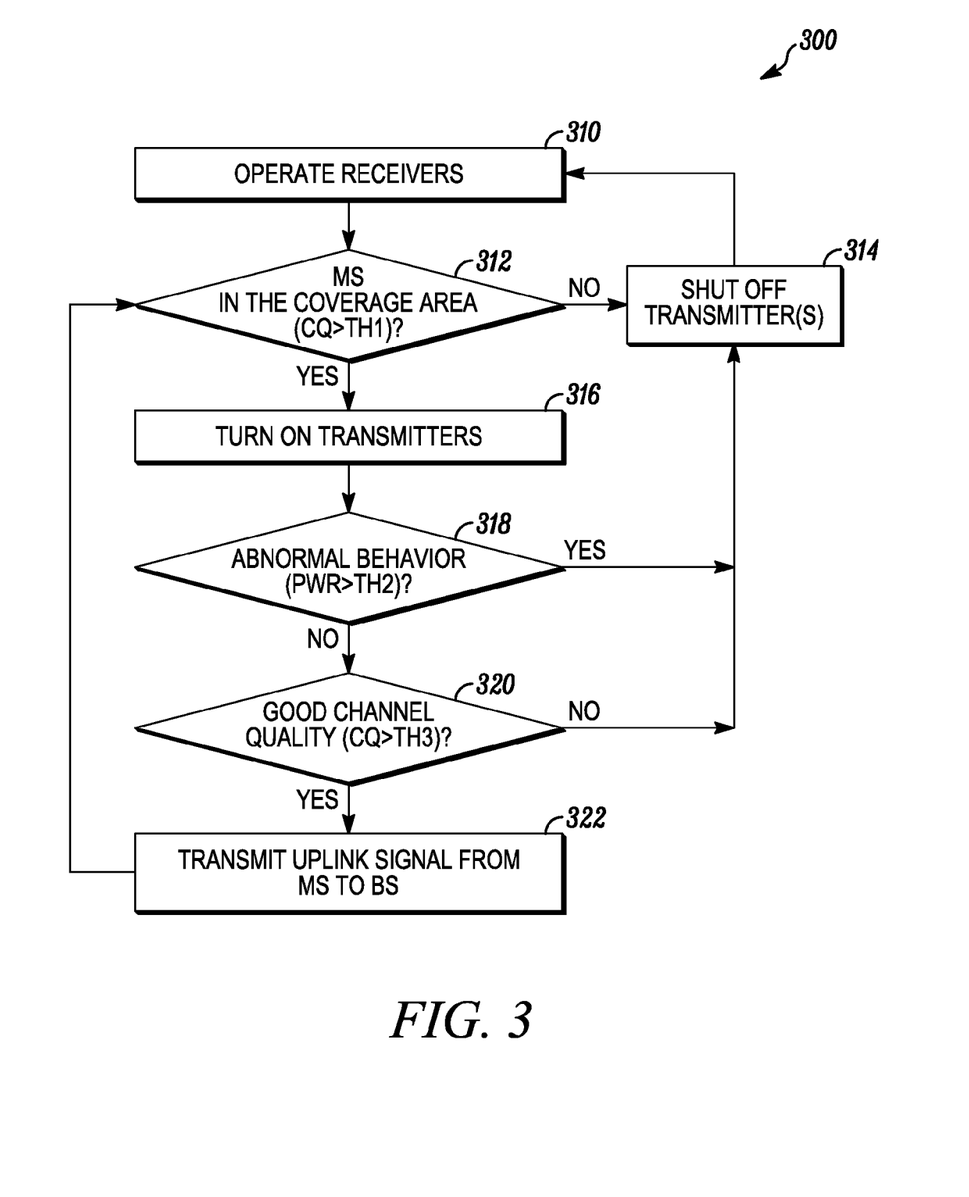
FIG. 3 is a flow diagram of a method of automatic on-off switching implemented by a repeater for a MIMO communication network in accordance with one or more embodiments.

Referring now to FIG. 3, a flow diagram of a method of automatic on-off switching implemented by a repeater for a MIMO communication network in accordance with one or more embodiments will be discussed. Method 300 of FIG. 3 may be implemented by a MIMO repeater such as repeater 128 of FIG. 1 and/or FIG. 2 in a MIMO network, such as network 100 of FIG. 1. For example, method 300 may be implemented in software and/or firmware to be executed by a controller (not shown) of repeater 128, although the scope of the claimed subject matter is not limited in these respects. Furthermore, method 300 illustrates an example or examples of method 300; however, in one or more alternative embodiments method 300 may include more or fewer blocks, and/or which may be arranged in various other orders than the order shown in FIG. 3, and the scope of the claimed subject matter is not limited in these respects. During execution of method 300, the receivers of repeater 128 may be turned on and operated at block 310. A determination may be made at block 312 if there is a mobile station in the coverage area of repeater 128. For example, such a determination may be made by measuring a channel quality at one or more of the receivers or repeater 128 and determining if the channel quality is better than a threshold value, such as a first threshold (TH1). In one non-limiting example, if none of the receivers of repeater 128 has a channel quality greater than a threshold value, then it may be determined that no mobile station is operating in the coverage area of repeater 128, in which case all the transmitters of repeater 128 may be turned off. By turning off all the transmitters of repeater 128 while there is no mobile station in the coverage area of repeater 128, repeater 128 does not contribute to the noise enhancement on network 100. While the transmitters of repeater 128 are turned off, repeater 128 may continue to operate its receivers at block 310 to listen for a mobile station that becomes operational within its coverage area. In the event that it is determined at block 312 that a mobile station becomes operational in the coverage area of repeater 128, for example, if the channel quality of one or more of the receivers of repeater 128 exceeds the threshold value, then one or more or all of the transmitters of receiver 128 are turned on at block 316.

in one or more embodiments, a determination may be made at block 318 if repeater 128 is experiencing abnormal behavior. For example, in a non-limiting example, if a power level at the output of one or more of the transmitters of repeater 128 exceeds a threshold value, such as a second threshold value (TH2), then the transmitters of repeater 128 may be turn off at block 314. In some embodiments, only the transmitter experiencing abnormal behavior may be shut down at block 314, and in alternative embodiments additional transmitters may be shut down at block 314, for example, all transmitters may be shut down if abnormal behavior is detected in any one or more of the transmitters. If no abnormal behavior is detected at block 318, in other words if the receivers and/or transmitters of repeater 128 are operating normally, a determination may be made at block 320 of the channel quality at the individual receivers of repeater 128. For example, such a per antenna channel quality determination at block 320 may be made by comparing the channel quality to a third threshold value (TH3). If the channel quality is not sufficient for a given antenna path of repeater 128, then that corresponding transmitter may be turn off at block 314 while other transmitters in antenna paths having sufficient channel quality may remain on. Such a per antenna switching algorithm may allow repeater 128 to operate with a reduced noise by not turning on transmitters that do not contribute much if anything to uplink transmissions, since using fewer antennas may result in less noise contribution by repeater 128. Repeater 128 may transmit uplink signals from the mobile station to base station 110 accordingly at block 322, and method 300 may continue at block 312 while one or more mobile stations are in the coverage area of repeater 128. An example system which may implement method 300 is shown in and described with respect to FIG. 4, below.

Figure 4:
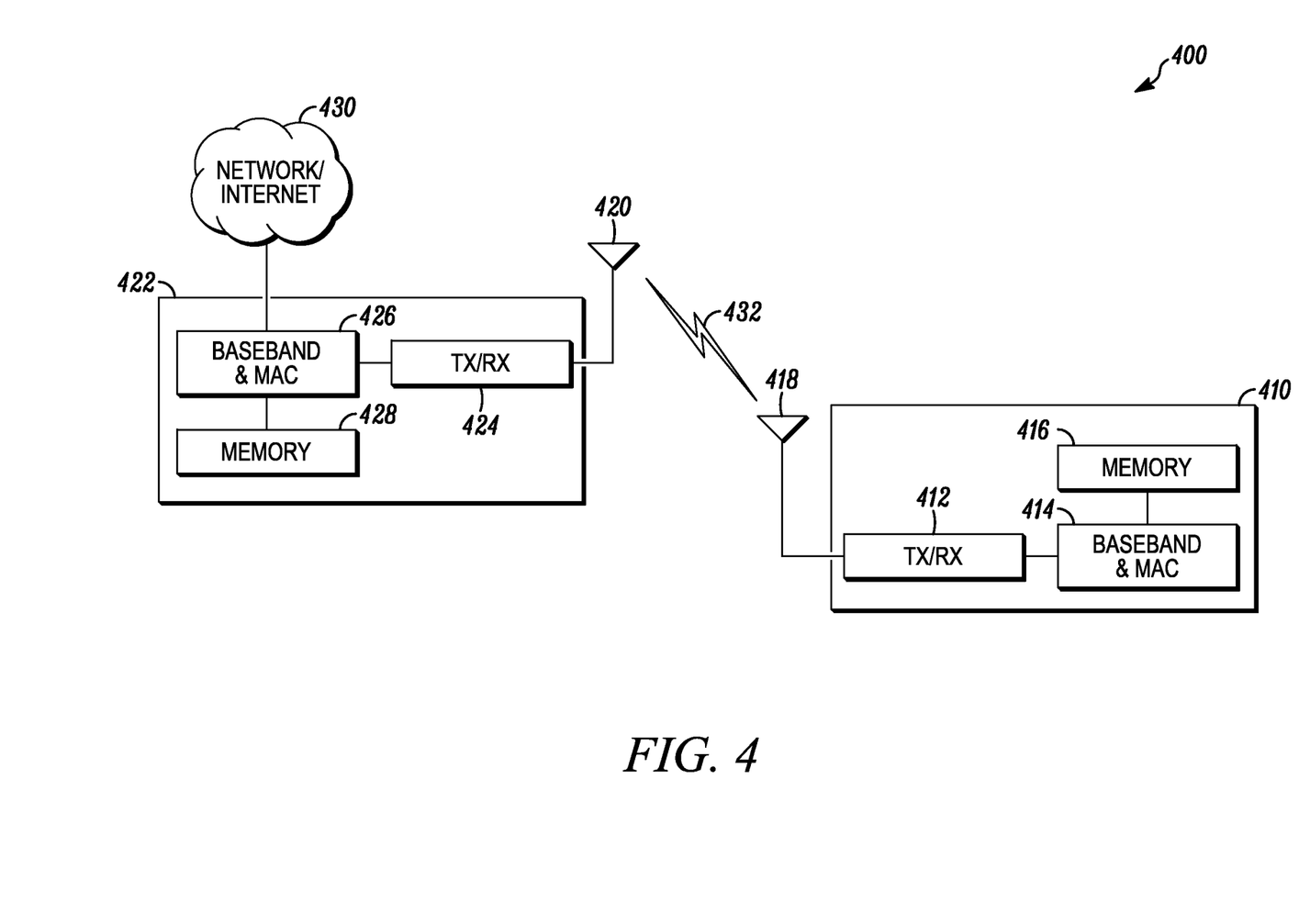
FIG. 4 is a block diagram of a wireless local area, personal area, or wireless wide area network communication system showing one or more network devices capable of utilizing automatic on-off switching in accordance with one or more embodiments.

Referring now to FIG. 4, a block diagram of a wireless local area, personal area, or wireless wide area network communication system showing one or more network devices capable of utilizing automatic on-off switching in accordance with one or more embodiments will be discussed. In the communication system 400 shown in FIG. 4, a mobile station 410 may include a wireless transceiver 412 to couple to an antenna 418 and to a processor 414 to provide baseband and media access control (MAC) processing functions. In one or more embodiments, mobile station 410 may be one of the mobiles stations as shown in and described with respect to FIG. 1. In one or more embodiments, mobile station 410 may comprise a cellular telephone or an information-handling system, such as a mobile personal computer or a personal digital assistant or the like, that incorporates a cellular telephone communication module, although the scope of the claimed subject matter is not limited in this respect. In one or more embodiments, mobile station 410 may comprise one of the repeaters as shown in and described with respect to FIG. 1 and/or FIG. 2, for example wherein a repeater may have the same or substantially similar architecture as that of mobile station 410, although the scope of the claimed subject matter is not limited in this respect. Processor 414 in one embodiment may comprise a single processor, or alternatively may comprise a baseband processor and/or an applications processor, although the scope of the claimed subject matter is not limited in this respect. Processor 414 may couple to a memory 416, which may include volatile memory, such as dynamic random-access memory (DRAM), non-volatile memory, such as flash memory, or alternatively may include other types of storage, such as a hard disk drive, although the scope of the claimed subject matter is not limited in this respect. Some portion or all of memory 416 may be included on the same integrated circuit as processor 414, or alternatively some portion or all of memory 416 may be disposed on an integrated circuit or other medium, for example, a hard disk drive, that is external to the integrated circuit of processor 414, although the scope of the claimed subject matter is not limited in this respect.

Mobile station 410 may communicate with access point 422 via wireless communication link 432, in which access point 422 may include at least one antenna 420, transceiver 424, processor 426, and memory 428. In one embodiment, access point 422 may be a base station, for example, base station 110 of FIG. 1, of a cellular telephone network or a wireless wide area network, such as a WiMAX network or the like, and in an alternative embodiment, access point 422 may be an access point or wireless router of a wireless local or personal area network, although the scope of the claimed subject matter is not limited in this respect. In an alternative embodiment, access point 422 and optionally mobile station 410 may include two or more antennas, for example, to provide a spatial division multiple access (SDMA) system or a multiple input, multiple output (MIMO) system example, as shown in and described with respect to FIG. 1, although the scope of the claimed subject matter is not limited in this respect. Access point 422 may couple with network 430 so that mobile station 410 may communicate with network 430, including devices coupled to network 430, by communicating with access point 422 via wireless communication link 432. Network 430 may include a public network, such as a telephone network or the Internet, or alternatively network 430 may include a private network, such as an intranet, or a combination of a public and a private network, although the scope of the claimed subject matter is not limited in this respect. Communication between mobile station 410 and access point 422 may be implemented via a wireless local area network (MAN), for example, a network compliant with a an Institute of Electrical and Electronics Engineers (IEEE) standard, such as IEEE 802.11a, IEEE 802.11b, IEEE 802.11n, HiperLAN-II, and so on, although the scope of the claimed subject matter is not limited in this respect. In another embodiment, communication between mobile station 410 and access point 422 may be at least partially implemented via a cellular communication network compliant with a Third Generation Partnership Project (3GPP or 3G) standard and/or a Wireless Interoperability for Microwave Access (WiMAX), although the scope of the claimed subject matter is not limited in this respect. In one or more embodiments, antenna 418 may be utilized in a wireless sensor network or a mesh network, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to an automatic on-off switching repeater for MIMO networks and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
   determining at a MIMO repeater if there is a mobile station in the coverage area of the MIMO repeater, the MIMO repeater comprising one or more antenna paths comprising one or more receivers coupled to one or more respective receive antennas and one or more transmitters coupled to one or more respective transmit antennas;
   turning off one or more transmitters of the MIMO repeater if there is no mobile station in the coverage area of the MIMO repeater;
   if there is a mobile station in the coverage of the MIMO repeater:
      measuring a channel quality in one or more antenna paths of the MIMO repeater received from the mobile station in the coverage area;
      turning off transmitters of the MIMO repeater that do not have a sufficient channel quality in a respective antenna path; and
      transmitting uplink signals from the mobile station via transmitters of the MIMO repeater that have a sufficient channel quality in the respective antenna path; and
   turning off one or more transmitters of the MIMO repeater if an output power the one or more transmitters detected by a power detector circuit and a power comparison circuit exceeds a first threshold value.

2. A method as claimed in claim 1, wherein said determining comprises comparing a channel quality to a second threshold value, and executing said turning off one or more transmitters if the channel quality is below the second threshold value.

3. A method as claimed in claim 2, wherein a sufficient number of the transmitters are turned off if the channel quality is below the second threshold value.

4. A method as claimed in claim 1, further comprising turning off one or more of the transmitters of the MIMO repeater if the MIMO repeater is experiencing abnormal behavior.

5. A method as claimed in claim 4, further comprising comparing a power level in one or more transmitters of the MIMO receiver to a second threshold value wherein the MIMO repeater is experiencing abnormal behavior if the power level exceeds the second threshold value.

6. A method as claimed in claim 1, further comprising comparing the channel quality to a second threshold value wherein an antenna path has a sufficient channel quality if the channel quality exceeds the second threshold value.

7. A method as claimed in claim 1, wherein said turning off one more transmitters of the MIMO repeater if there is no mobile station in the coverage area of the MIMO repeater comprises turning off all a sufficient number of the transmitters of the MIMO repeater.

8. A repeater for a MIMO network, comprising:
- one or more antenna paths comprising one or more receivers coupled to one or more respective receive antennas and one or more transmitters coupled to one or more respective transmit antennas;
- a channel measure circuit coupled to the one or more receive antennas to measure a channel quality at the one or more receivers;
- a comparison circuit to compare the channel quality at the one or more receivers to a threshold value and to turn off a sufficient number of the transmitters if the channel quality at the one or more receivers is less than a first threshold value, and to turn on a transmitter in the antenna path if the channel quality at a corresponding receiver exceeds a second threshold value and
- a power detector circuit coupled to the one or more transmit antennas to measure a power level and a power comparison circuit to turn of the one or more transmitters if the power level at the transmit antennas exceeds a third threshold value.

9. A repeater as claimed in claim 8, further comprising a switch coupled to a power amplifier in the one or more antenna paths, wherein the power detector circuit is capable of controlling the switch to turn on or turn of the power amplifier.

10. A repeater as claimed in claim 8, further comprising a switch coupled to a power amplifier in the one or more antenna paths, wherein the comparison circuit is capable of controlling the switch to turn on or turn off the power amplifier.

11. A system, comprising:
- a base station to communicate with one or more mobile stations; and
- a MIMO repeater to retransmit an uplink signal from the one or more mobile stations to the base station via multiple-input and multiple-output communications, said MIMO repeater comprising:
  - one or more antenna paths comprising one or more receivers coupled to one or more respective receive antennas and one or more transmitters coupled to one or more respective transmit antennas;
  - a channel measure circuit coupled to the one or more receive antennas to measure a channel quality at the one or more receivers;
  - a comparison circuit to compare the channel quality at the one or more receivers to a threshold value and to turn off a sufficient number of the transmitters if the channel quality at the one or more receivers is less than a first threshold value, and to turn on a transmitter in the antenna path if the channel quality at a corresponding receiver exceeds a second threshold value; and
  - a power detector circuit coupled to the one or more transmit antennas to measure a power level and a power comparison circuit to turn of the one or more transmitters if the power level at the transmit antennas exceeds a third threshold value.

12. A system as claimed in claim 11, further comprising a switch coupled to a power amplifier in the one or more antenna paths, wherein the power detector circuit is capable of controlling the switch to turn on or turn of the power amplifier.

13. A system as claimed in claim 11, further comprising a switch coupled to a power amplifier in the one or more antenna paths, wherein the comparison circuit is capable of controlling the switch to turn on or turn off the power amplifier.

14. A system as claimed in claim 11, wherein the base station is part of a wireless local area network, wireless wide area network, or a personal area network, or combinations thereof.

* * * * *